(12) United States Patent
Satapathy et al.

(10) Patent No.: US 10,860,311 B2
(45) Date of Patent: Dec. 8, 2020

(54) METHOD AND APPARATUS FOR DRIFT MANAGEMENT IN CLUSTERED ENVIRONMENTS

(71) Applicant: DELL PRODUCTS, LP, Round Rock, TX (US)

(72) Inventors: Shibasis Satapathy, Bangalore (IN); Harsha Naik, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/007,422

(22) Filed: Jun. 13, 2018

(65) Prior Publication Data

US 2020/0073656 A1 Mar. 5, 2020

(51) Int. Cl.
| | |
|---|---|
| *G06F 9/44* | (2018.01) |
| *G06F 8/71* | (2018.01) |
| *G06F 11/22* | (2006.01) |
| *H04L 25/02* | (2006.01) |
| *G06F 9/38* | (2018.01) |
| *G06F 9/30* | (2018.01) |
| *G06F 11/07* | (2006.01) |

(52) U.S. Cl.
CPC ............ *G06F 8/71* (2013.01); *G06F 9/30145* (2013.01); *G06F 9/3891* (2013.01); *G06F 11/0766* (2013.01); *G06F 11/2284* (2013.01); *G06F 11/2289* (2013.01); *H04L 25/02* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 9,424,944 B2 | 8/2016 | Sun et al. | |
| 9,678,803 B2* | 6/2017 | Suit | ...... H04L 41/0853 |
| 2011/0225275 A1* | 9/2011 | Shah | .... G06F 9/44505 709/223 |
| 2011/0246504 A1* | 10/2011 | Slater | ...... G06Q 10/00 707/769 |
| 2017/0111215 A1* | 4/2017 | Chou | ..... H04L 41/0618 |
| 2017/0214576 A1* | 7/2017 | Pan | ...... H04L 41/0816 |
| 2017/0262344 A1* | 9/2017 | Shaw | ........ G06F 3/065 |
| 2018/0052641 A1* | 2/2018 | Hayashi | ........ G06F 3/0688 |
| 2019/0036797 A1* | 1/2019 | Margalit | ........ G06F 11/0709 |

* cited by examiner

*Primary Examiner* — Zahid Choudhury
(74) *Attorney, Agent, or Firm* — Larson Newman, LLP (57) ABSTRACT

Configuration drift from a baseline configuration is autonomously resolved. A baseboard management controller may inspect error and/or failure logs to determine system parameters at times of error/failure. The baseboard management controller may compare the system parameters to the baseline configuration. The baseboard management controller may have authority to autonomously change any of the system values to resolve a configuration drift from the baseline configuration.

20 Claims, 10 Drawing Sheets

METHOD AND APPARATUS FOR DRIFT MANAGEMENT IN CLUSTERED ENVIRONMENTS

FIELD OF THE DISCLOSURE

The present disclosure generally relates to information handling systems, and relates more particularly to machine configuration of physical nodes in a compute cluster.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Configuration drift from a baseline configuration is autonomously resolved. A baseboard management controller may inspect error and/or failure logs to determine system parameters at times of error/failure. The baseboard management controller may compare the system parameters to the baseline configuration. The baseboard management controller may have authority to autonomously change any of the system values to resolve a configuration drift from the baseline configuration.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
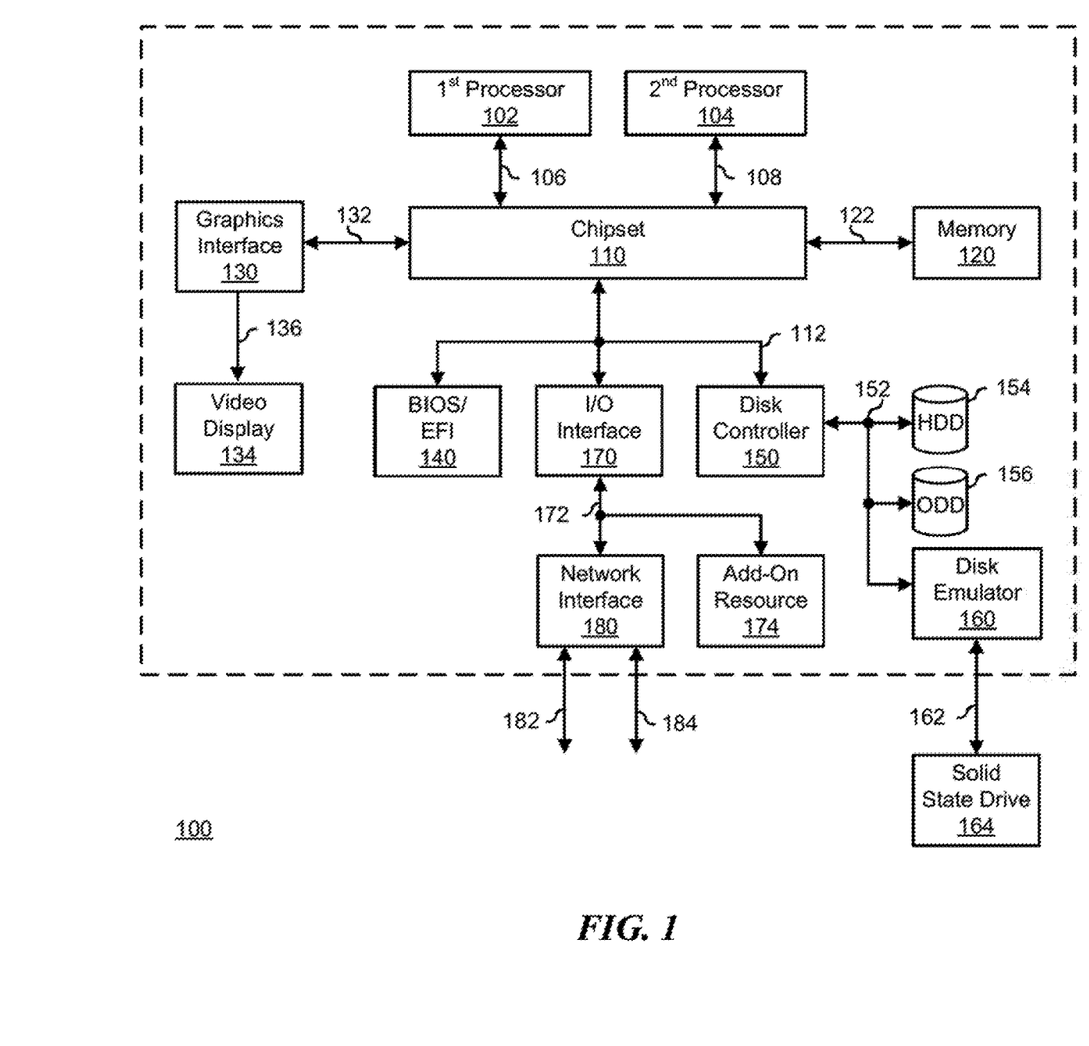
FIG. 1 is a block diagram illustrating an information handling system according to an embodiment of the present disclosure.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
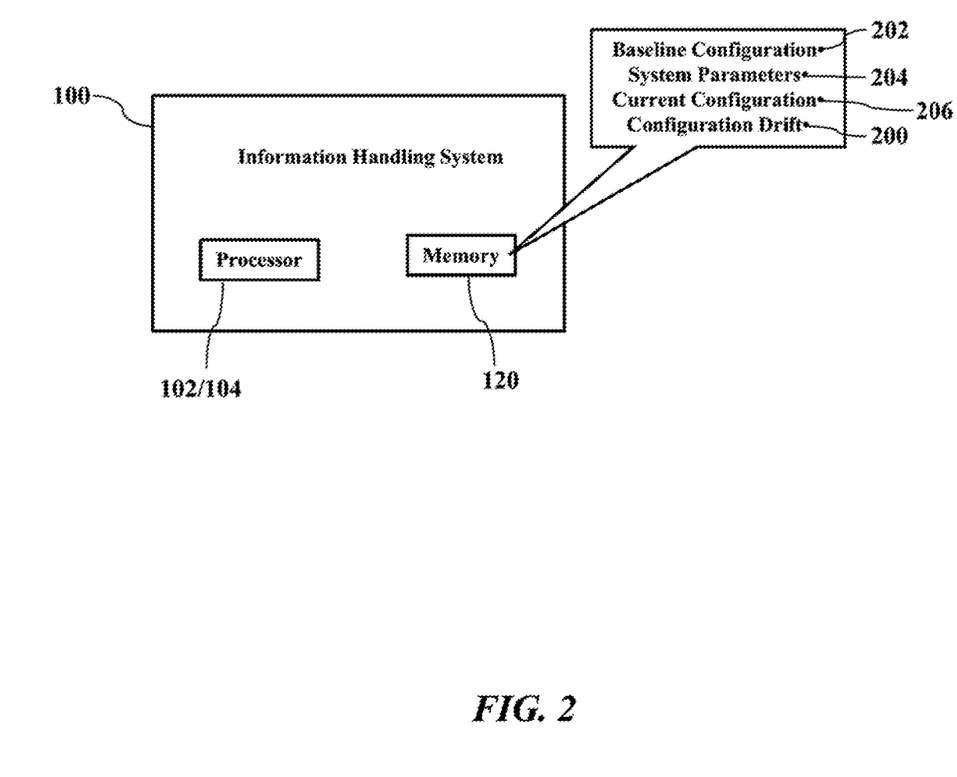
FIG. 2 is a simple illustration of thermal management, according to exemplary embodiments.

FIG. 2 is a simple illustration of thermal management, according to exemplary embodiments. Here the information handling system 100 has an initial or baseline configuration 202 describing system parameters 204 related to hardware components, software applications, firmware, and other functional and performance characteristics. Over time, though, the baseline configuration 202 changes. That is, as time progresses, at least some of the system parameters 204 deviate from their initial values to different, current values, due to many reasons. The information handling system 100 thus has a current configuration 206 representing the configuration drift 200 from the baseline configuration 202. The configuration drift 200 may be minor and/or inconsequential. Sometimes, however, the configuration drift 200 may result in reduced performance or even an unstable operating condition.

Figure 3:
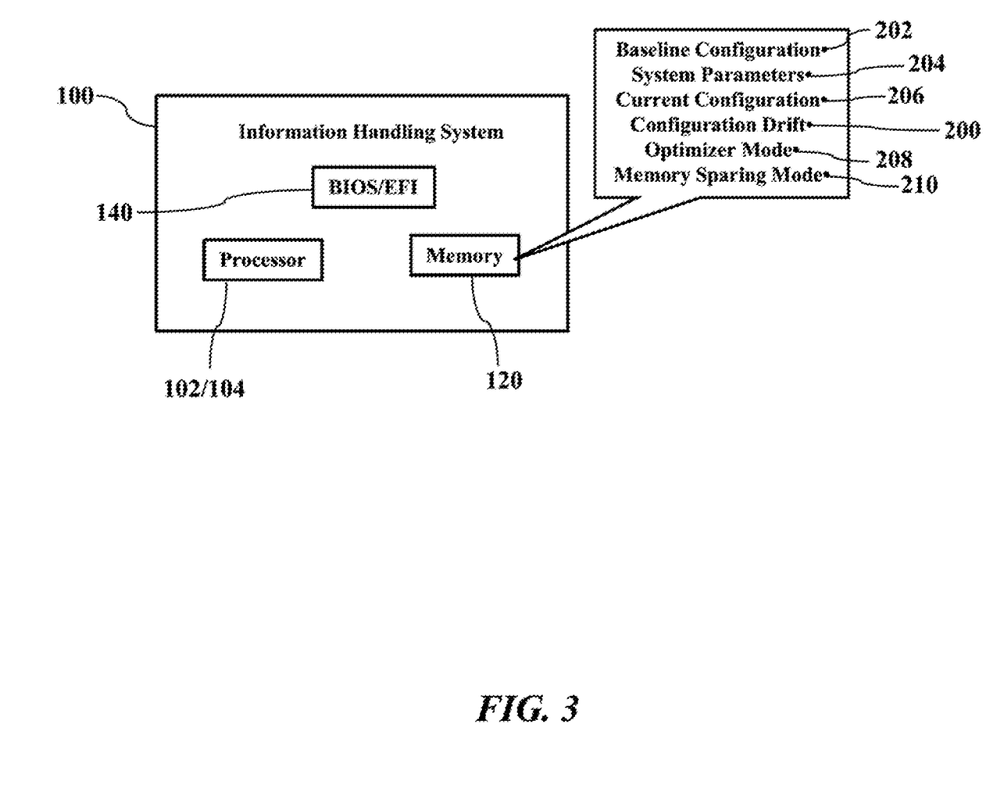
FIG. 3 is a more detailed illustration of thermal management, according to exemplary embodiments.

FIG. 3 is a more detailed illustration of the configuration drift 200. Recall that the information handling system 100 has the BIOS/EFI module 140 that detects hardware and software resources. The BIOS/EFI module 140 may have different operating modes for the memory 120. Suppose, for example, that the baseline configuration 202 sets the BIOS/EFI module 140 to an optimizer mode 208. The optimizer mode 208 permits a larger total memory capacity (such as dual in-line memory modules) for maximum performance. However, suppose also that as the information handling system 100 operates over time, somehow the BIOS/EFI module 140 is switched to a memory sparing mode 210. The memory sparing mode 210 reserves a portion of the memory 120 for spare usage in case of error or failure. The unintentional and/or unplanned configuration drift 200 has changed the memory 120 and perhaps greatly reduced performance.

Figure 4:
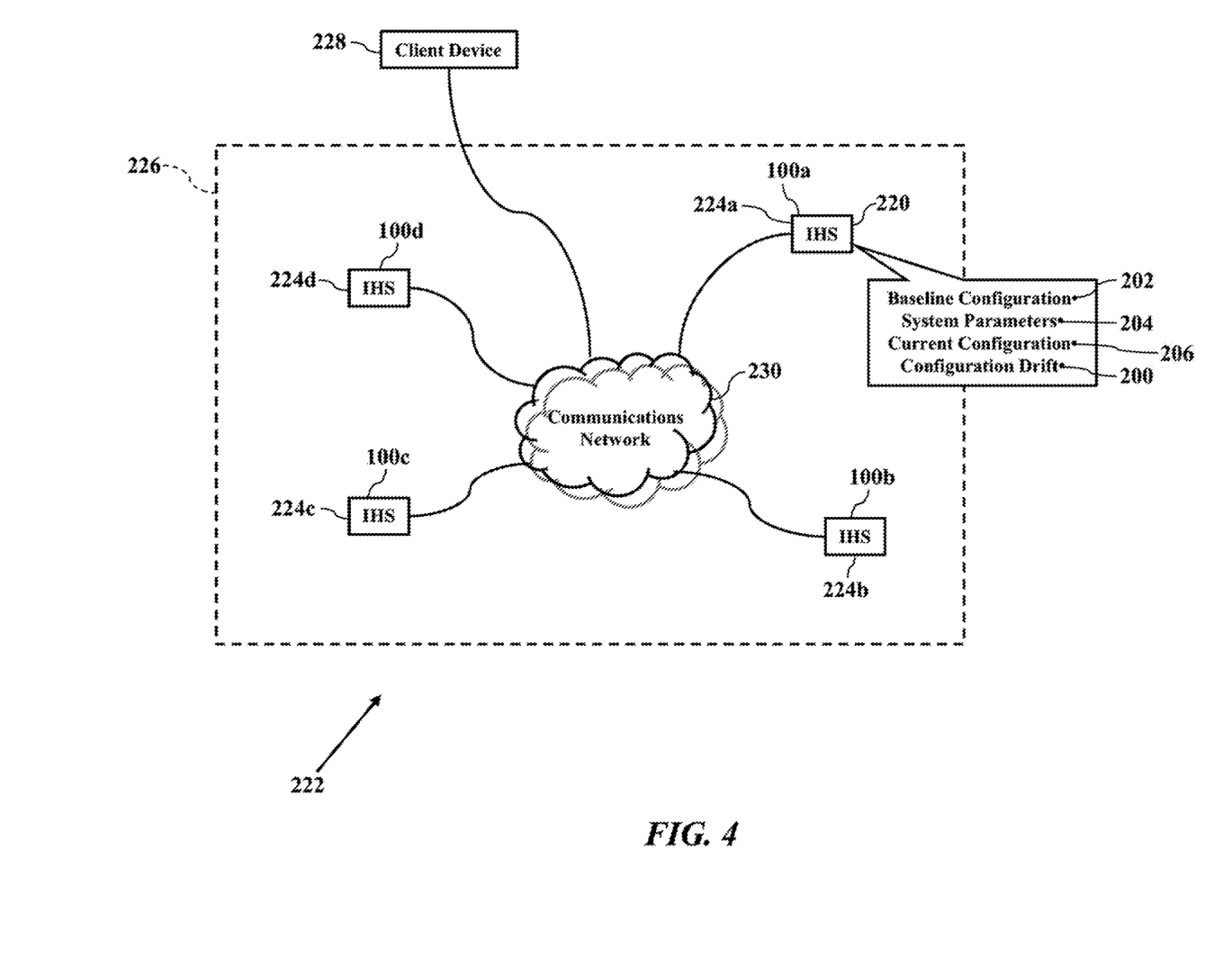
FIG. 4 illustrates thermal management during a maximum workload, according to exemplary embodiments.

FIG. 4 illustrates thermal management during a maximum workload. Here the information handling system 100 operates as a server 220 in a clustered computing environment 222. That is, the information handling system 100 operates as a computing node 224 in a cluster 226. Clustering is usually carried out to provide high availability (that is redundancy in the case of node failure). While there may be any number of the information handling systems 100 operating as the computing nodes 224 in the cluster 226, for simplicity FIG. 4 only illustrates four of the computing nodes (illustrated, respectively, as reference numerals 224*a*-*d*). Each one of the computing nodes 224*a*-*d* may even host virtual machines and provide shared resources for hundreds or thousands of client devices 228. The computing nodes 224*a*-*d* and the client device 228 communicate via a communications network 230 to send and receive electronic data.

Each computing node 224 is initially installed with the baseline configuration 202. However, as the computing node 224 operates, somehow the configuration drift 200 creeps in and the baseline configuration 202 changes. The configuration drift 200 may have been caused by subtle changes to software, by a failure of a hardware component (such as disk drive or network interface card), and/or by malicious code or command. Regardless, the configuration drift 200 may change an individual machine's performance and/or an overall performance of the entire cluster 226. The configuration drift 200 may also cause an unintended or unintentional change to a software service provided by the cluster 226 to the client device 228.

The configuration drift 200 is especially acute in data center environments. Unplanned configuration changes may always be a risk in a high availability cluster, especially when server and switch hardware is frequently repaired and replaced and software patches are updated.

Figure 5:
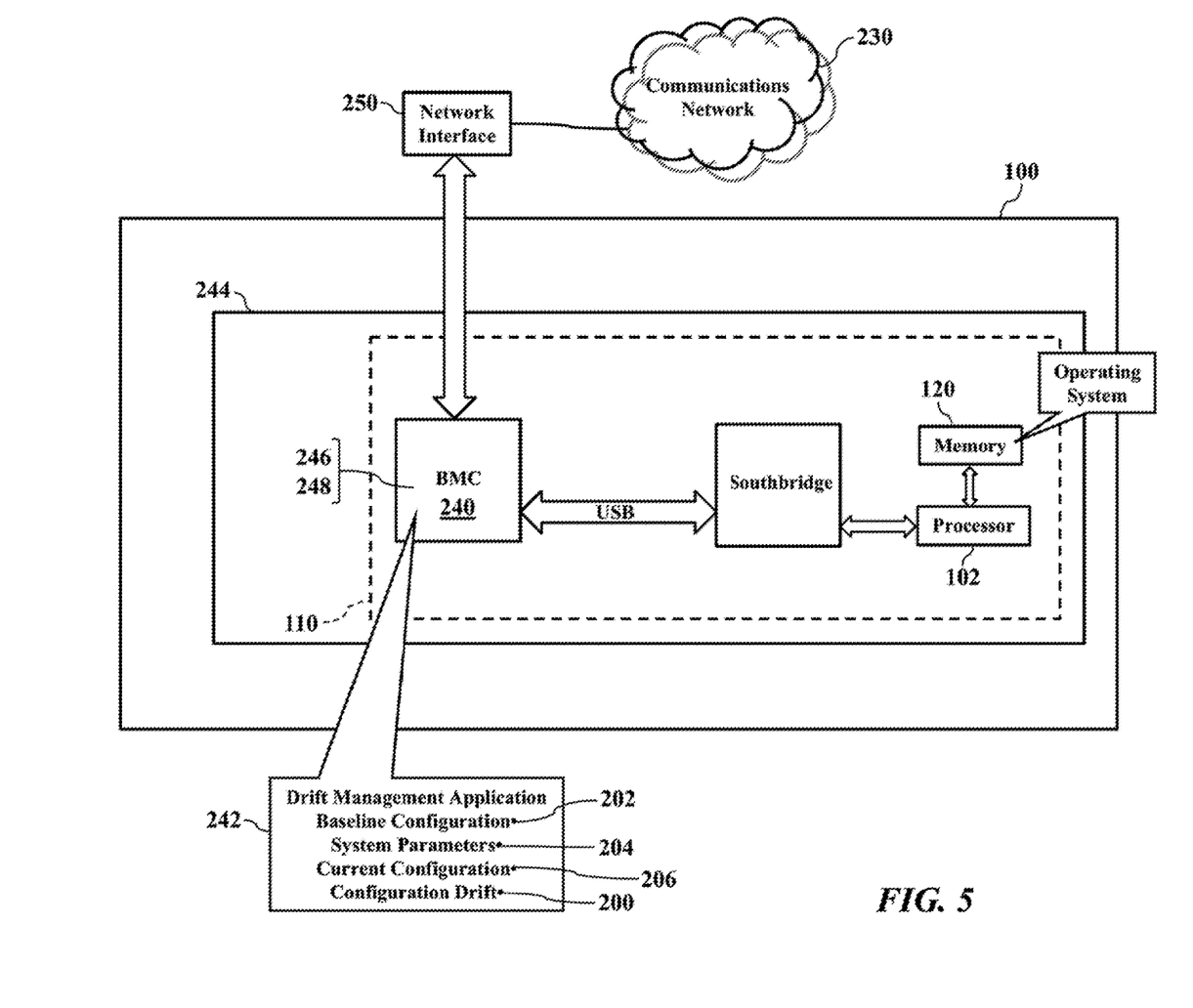
FIG. 5 illustrates thermal management during a customer workload, according to exemplary embodiments.
Figure 6:
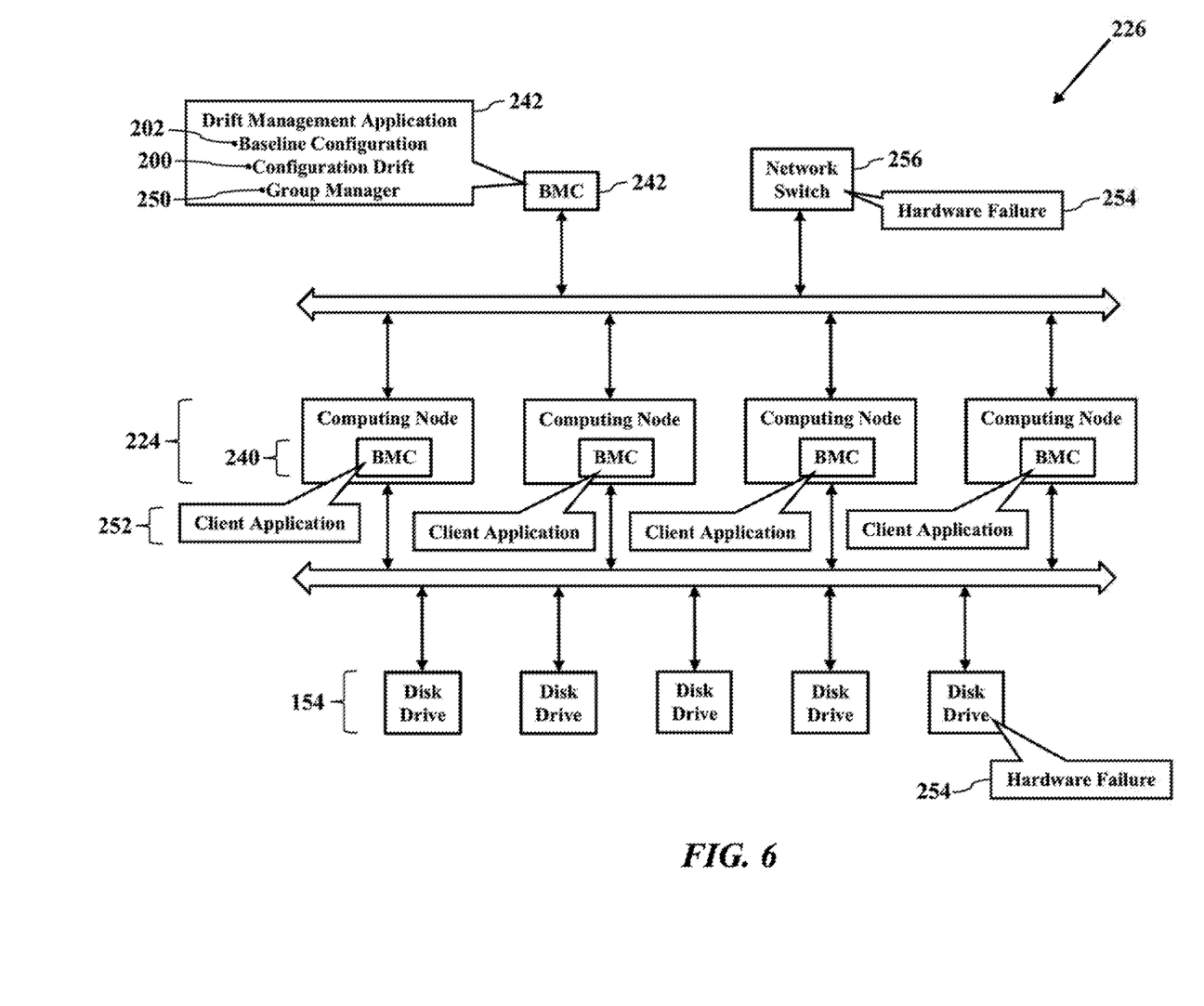
FIG. 6 illustrates thermal management by a baseboard management controller, according to exemplary embodiments.
Figure 7:
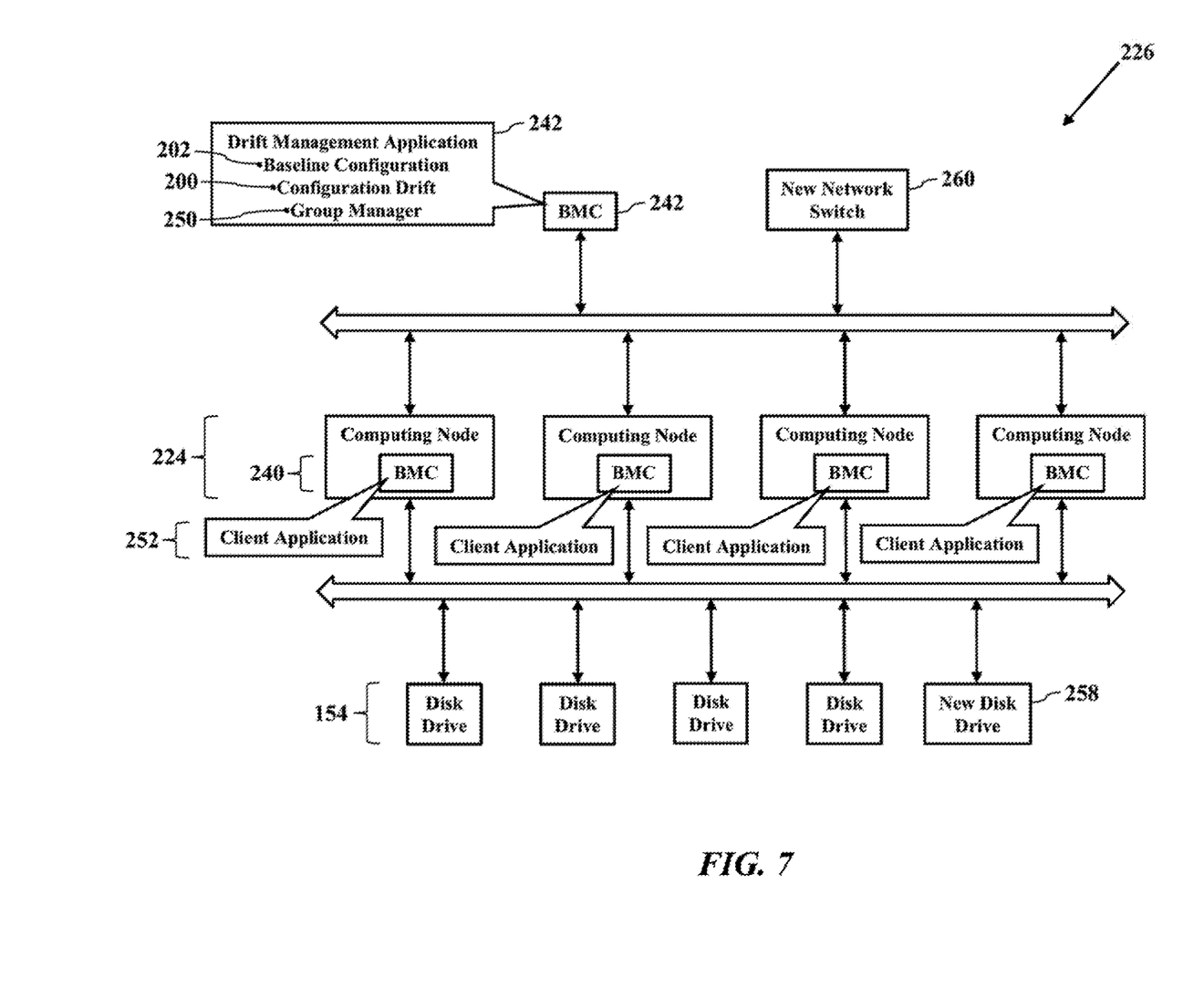
FIG. 7 illustrates power monitoring, according to exemplary embodiments.

FIGS. 5-7 illustrate drift configuration management, according to exemplary embodiments. Here exemplary embodiments identify or detect the configuration drift 200 and autonomously re-establish the baseline configuration 202. As FIG. 5 illustrates, a baseboard management controller (BMC) 240 executes a drift management application 242. The information handling system 100 has a motherboard 244 including the chipset 110. However, the information handling system 100 may also have the separate baseboard management controller 240. The baseboard management controller 240 has its own dedicated hardware (such as a processor 246 and solid-state memory device 248), and the baseboard management controller 240 interfaces with the motherboard 244 to provide side-band and out-of-band remote management of the information handling system 100. The baseboard management controller 240 has one or more physical communications links and interfaces to the motherboard 244, thus allowing the baseboard management controller 240 to process messages according to the Intelligent Platform Management Interface (IPMI) specification. The baseboard management controller 240 may thus monitor and report the functions and performance of the information handling system 100 via a separate network interface 250 to the communications network 230. The IPMI specification is generally well known and thus need not be explained in detail. Regardless, the baseboard management controller 240 may determine the configuration drift 200 and implement corrective actions that re-establish the baseline configuration 202.

FIGS. 6-7 again illustrate the cluster 226. Here each computing node 224 has its own baseboard management controller 240. One of the baseboard management controllers 240, though, may be configured as an administrative group manager 250 of the cluster 226. That is, the group manager 250 may store and execute the drift management application 242, while each other computing node 224 stores and executes a client application 252. The drift management application 242 and any of the client applications 252 may thus cooperate in a client/server or agency relationship to identify and to resolve or remediate the configuration drift 200. As a common example, suppose any one of the computing nodes 224 detects a hardware failure 254 in any of the disk drives 154. The corresponding client application 252 identifies the error or failure details, captures a reason or explanation of error or failure, and propagates this information to the group manager 250 for cache or other storage. Similarly, another one of the client applications 252 may report a problem or other hardware failure 254 in a network switch 256.

As FIG. 7 illustrates, new cluster components may self-identify. For example, once a new disk drive 258 is installed, the new disk drive 258 identifies itself to one of the client applications 252. One of the computing nodes 224 may also detect a new network switch 260. The group manager 250 (executing the drift management application 242) may then compare any configuration values to the baseline configuration 202, detect the configuration drift 200, and implement a pre-configured or predetermined remediation scheme.

Exemplary embodiments thus present an elegant solution. The drift management application 242 is a software-based solution that inverts responsibility for detecting and resolving the configuration drift 200. Conventional drift management usually requires human, administrative resolution and fine tuning in an ad hoc manner. Exemplary embodiments, instead, use software-based rules to detect the configuration drift 200 and automatically restore the baseline configuration 202 without manual intervention.

Figure 8:
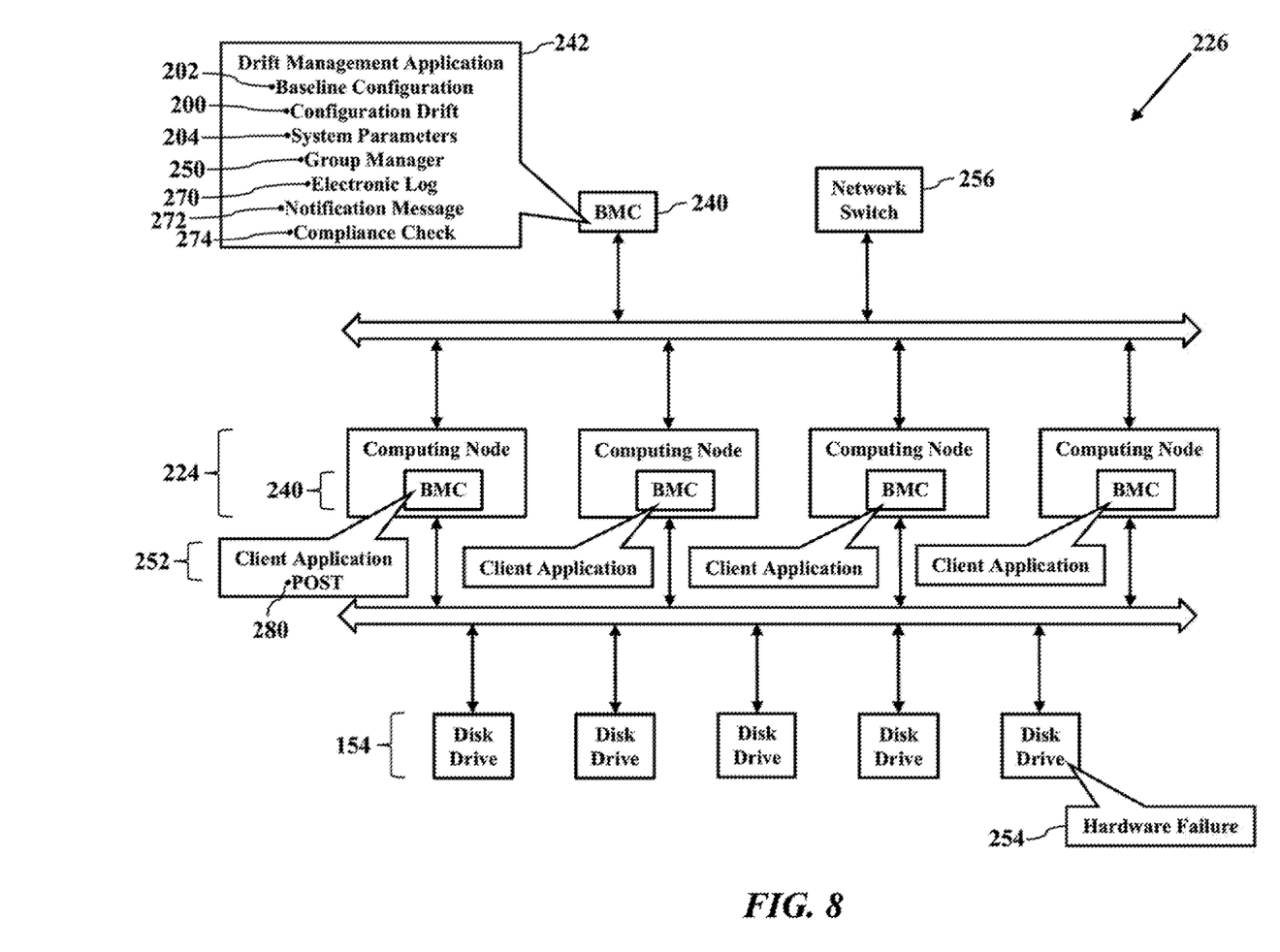
FIG. 8 illustrates a method or process for thermal management, according to exemplary embodiments.

FIG. 8 further illustrates the hardware failure 254 within the cluster 226, according to exemplary embodiments. Here exemplary embodiments identify the configuration drift 200 caused by the hardware failure 254 (again illustrated as one of the disk drives 154 within the cluster 226. Should any computing node 224 detect the hardware failure 254, the corresponding client application 252 reports the hardware failure 254 to the group manager 250. The drift management application 242 causes the baseboard management controller 240 (acting as the group manager 250) to add and log the hardware failure 254 as an entry to an electronic log 270. The drift management application 242 may then inspect the electronic log 270 to identify any entry or entries that indicate the configuration drift 200. As a simple example, the drift management application 242 may search the electronic log 270 for specific error codes and capture or copy any accompanying description or explanation. The drift management application 242 may then cause the baseboard management controller 240 to generate a notification message 272. The notification message 272 may be sent to any destination to alert of the hardware failure 254 and/or any configuration drift 200. Information technology administration is thus informed of the hardware failure 254, and a human administrator usually takes the node offline and removes and replaces the failed hardware component.

Compliance is then monitored. Once the computing node 224 electrically powers up and/or its baseboard management controller 240 returns online for operation, the drift management application 242 executes a compliance check 274. The drift management application 242, in other words, automatically reads or retrieves the current values of the system parameters 204 and compares to the baseline configuration 202. If any differences are determined, the drift management application 242 may be configured with authority to autonomously change any system parameter 204 that differs from the baseline configuration 202.

The baseboard management controller 240 may thus self-diagnose the configuration drift 200. The baseboard management controller 240, executing the drift management application 242, may perform the compliance check 274 at any time (such as during a power-on self-test 280). The compliance check 274 may additionally or alternatively be performed in response to detection of any hardware component (such as PCI interface, PCI bus, network interface, or network presence). The compliance check 274 compares the current configuration 206 to the baseline configuration 202 and notes or logs any discrepancies. Moreover, the drift management application 242 may also change any system parameter 204 that fails to match its corresponding value or setting in the baseline configuration 202.

Exemplary embodiments thus describe an elegant BMC-based solution. The drift management application 242 causes the baseboard management controller 240 to perform operations, such as inspecting or monitoring the electronic log 270 of failures for any entries associated with the hardware failure 254. Once the hardware failure 254 is resolved, the baseboard management controller 240 performs the compliance check 274 and repairs any offending system parameters 204. Exemplary embodiments thus identify the hardware failure 254 in an individual server and/or within the cluster 226. The cluster 226, for example, may be a high-availability (Hyper V) servers hosting virtual machines, storage spaces direct (S2D) servers with local-attached drives, or even a hyper converged infrastructure (such as a VxRail appliance). A Hyper V server, for example, may enter a maintenance mode and failure details are captured in the electronic log 270 of failures. The baseboard management controller 240, executing the drift management application 242, monitors the electronic log 270 of failures to detect any entry matching known failures (such as "% SystemRoot %\Cluster\Reports\Validation Report date and time.html). The drift management application 242 is thus software-based solution that inverts responsibility for detecting the configuration drift 200 and automatically restoring the baseline configuration 202 without manual intervention.

Figure 9:
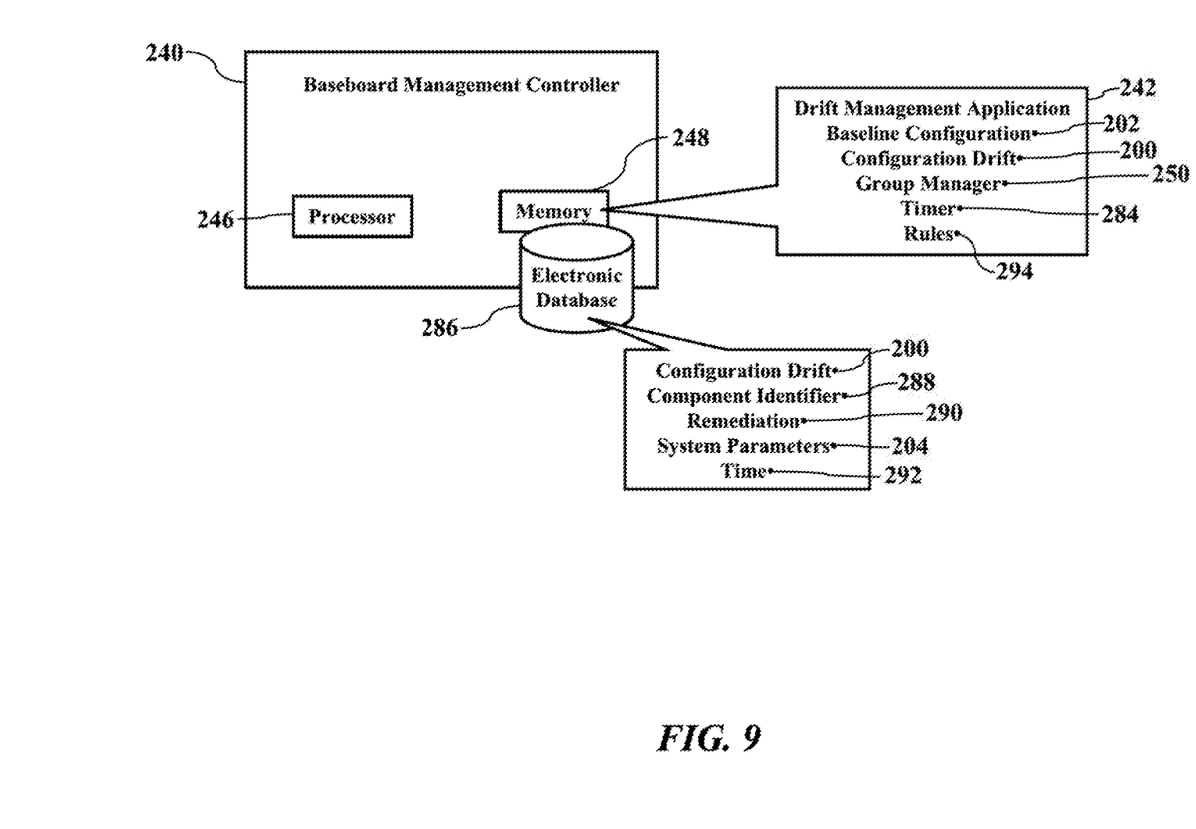
FIG. 9 is a recurring instance of the configuration drift 200, according to exemplary embodiments.

FIG. 9 illustrates a recurring instance of the configuration drift 200, according to exemplary embodiments. Here multiple management consoles may simultaneously, or nearly simultaneously, detect the configuration drift 200 and apply changes to the system parameters 204. This scenario is especially acute in a data center where multiple administrators, and/or competing software tools, manage state configuration by always resetting the configuration of the baseline server. As the reader may envision, there is a chance that concurrent human administration and the competing software tools will offset each other, thus continually changing the system parameters 204 in a forever loop.

Exemplary embodiments thus resolve the recurring configuration drift 200. The recurring configuration drift 200 may be any detectable drift which occurs in a short span of time. For example, Microsoft's desired state configuration (DSC) offers an orchestration tool (ANSIBLE®) specifying baseline parameters that maintain a desired state configuration or attributes of components in the cluster (illustrated as reference numeral 226 in FIGS. 4 & 6-8). As another example, some consoles have an integrated alert mechanism for configuration changes in their system and on receiving alerts perform remediation action. These and other software tools may attempt to set the system parameters 204, but these software tools may be immediately offset by Microsoft's desired state configuration, thus resulting in continued examples of the configuration drift 200. Moreover, other cases may exist where attributes inside a server in the cluster 226 will change periodically due to partial failure of certain components, in this case DSC/Ansible will always try to set baseline parameters which will be again and again offset by the behavior in a server which will cause instability inside a datacenter.

The recurring configuration drift 200 may also periodically occur. Consoles and/or development tools may be provisioned to periodically compare the servers with the baseline configuration 202. If automatic remediation is triggered, then automatic remediation may apply drifted attributes. The recurring configuration drift 200 may thus have properties representing the same or similar drift attributes and/or drift reoccurs in the same nodal system or within the cluster 226.

The drift management application 242 may thus identify and resolve the recurring configuration drift 200. The drift management application 242 may cause the baseboard management controller 240 to identify the configuration drift 200 and to initiate a timer 284. The timer 284 has an initial value (perhaps zero) and increments up or down. As the timer 284 counts, the baseboard management controller 240 continues inspection of further or additional instances of the configuration drift 200 (such as by inspecting the electronic log 270, as above explained). The drift management application 242 may cause the baseboard management controller 240 to store, cache, and/or record each instance or observation of the configuration drift 200. As a simple example, FIG. 9 illustrates the electronic log 270 as an electronic database 286 stored or maintained in the solid-state memory device 248 of the baseboard management controller 240. The electronic database 286 has entries that electronically associate each instance of the configuration drift 200 to its corresponding current time value of the timer 284. That is, the electronic database 286 electronically associates each configuration drift 200 to its corresponding source, component, or generator identifier 288, any remediation 290 implemented to resolve the configuration drift 200, any values or changes in values associated with the system parameters 204, and a time value 292 of the timer 284.

Exemplary embodiments may inspect and analyze the entries logged in the electronic database 286. As the drift management application 242 instructs the baseboard management controller 240 to monitor the entries logged in the electronic database 286, the baseboard management controller 240 may inspect the entries to identify possible instances of the recurring configuration drift 200. As a simple example, the baseboard management controller 240 may inspect and compare any three (3) successive entries. The baseboard management controller 240 may even compare the entries to one or more logical rules 294 for determining the recurring configuration drift 200. One such rule 294 may compare the values, or the changes in values, associated with the system parameters 204. If the values or the changes in the values are the same or substantially identical for all three (3) entries, then the rule 294 may also inspect and compare the corresponding times 292 associated with the three (3) successive entries. If the intervals between any two (2) of the time values 292 are approximately equal, then the rule 294 may cause the baseboard management controller 240 to label, denote, or designate the three (3) successive entries as the recurring configuration drift 200. The rule 294 may also cause the baseboard management controller 240 to prioritize the three (3) successive entries as the recurring configuration drift 200 with a priority. Because the recurring configuration drift 200 has been identified via the rule 294, the drift management application 242 may stop or halt any remediation, generate the notification message (illustrated as reference numeral 272 in FIG. 8), and send the notification message 272 to any network destination or address (such as a particular console, a particular software application, and/or a particular administrator's email or smartphone number). Exemplary embodiments may even await administrative approval for any changes to the system parameters 204 associated with the notification message 272, thus ensuring any changes to the baseline configuration 202 are formally approved and propagated to all the nodes in the cluster 226.

Figure 10:
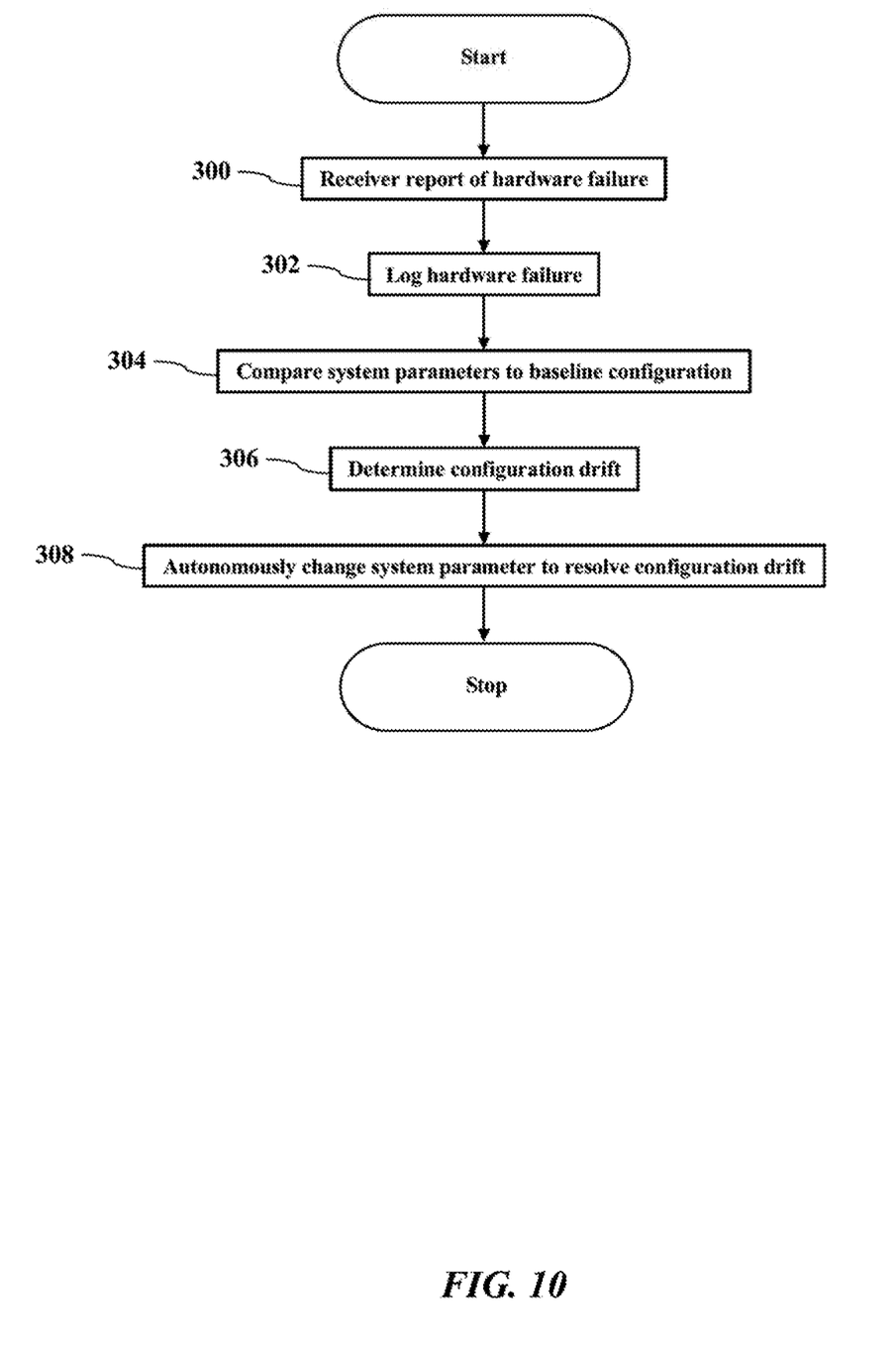
FIG. 10 is a method or process for drift management, according to exemplary embodiments.

FIG. 10 illustrates a method or process for drift management, according to exemplary embodiments. The client applications 252 send reports of errors, problems, or other hardware failures 254 (Block 300). The group manager 250 of the cluster 226 logs the reports of errors, problems, or other hardware failures 254 (Block 302). At any time, the system parameters 204 may be compared to the baseline configuration 202 (Block 304) to determine the configuration drift 200 (Block 306). The baseboard management controller 240 may then autonomously change any of the system parameters 204 to resolve or mediate the configuration drift 200 (Block 308).

Exemplary embodiments may packetize. The information handling system 100 and the baseboard management controller 240 may interface with a local area network and/or a wide area network (such as the Internet). Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (World Wide Web), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of drift management for an information handling system, comprising:

executing, by a baseboard management controller operating in the information handling system, a power-on self-test;

determining, by the baseboard management controller during the executing of the power-on self-test, a computing node experiencing a hardware failure associated with a cluster;

receiving, by the baseboard management controller during the executing of the power-on self-test, system parameters stored by the computing node experiencing the hardware failure;

performing, by the baseboard management controller during the executing of the power-on self-test, a compliance check by comparing the system parameters to a baseline configuration established for all computing nodes associated with the cluster;

in response to a deviation between the system parameters and the baseline configuration, determining, by the baseboard management controller during the executing of the power-on self-test, a configuration drift; and resolving, by the baseboard management controller during the executing of the power-on self-test, the configuration drift by autonomously changing any of the system parameters.

2. The method of claim 1, further comprising reporting the configuration drift.

3. The method of claim 1, further comprising retrieving the system parameters at a network detection of the computing node.

4. The method of claim 1, further comprising retrieving the system parameters after a detection of a hardware component in the computing node.

5. The method of claim 1, further comprising switching an operating mode of a basic input/output system in response to the configuration drift.

6. The method of claim 1, further comprising inspecting an electronic log of failures to determine the computing node experiencing the hardware failure.

7. The method of claim 1, further comprising notifying a group manager of the cluster of the configuration drift.

8. An information handling system, comprising:
a baseboard management controller; and
a memory device accessible to the baseboard management controller, the memory device storing instructions that when executed cause the baseboard management controller to perform operations, the operations including:
executing a power-on self-test;
determining, during the executing of the power-on self-test, a computing node experiencing a hardware failure associated with a cluster;
retrieving, during the executing of the power-on self-test, system parameters stored by the computing node experiencing the hardware failure;
compliance checking, during the executing of the power-on self-test, by comparing the system parameters to a baseline configuration established for all computing nodes associated with the cluster;
determining, during the executing of the power-on self-test, a configuration drift in response to a deviation between the system parameters and the baseline configuration; and
resolving the configuration drift during the executing of the power-on self-test by executing a software application that autonomously changes any of the system parameters.

9. The system of claim 8, wherein the operations further comprise monitoring a log describing the computing node experiencing the hardware failure.

10. The system of claim 8, wherein the operations further comprise retrieving the system parameters at a network detection of the computing node.

11. The system of claim 8, wherein the operations further comprise retrieving the system parameters after a detection of a hardware component in the computing node.

12. The system of claim 8, wherein the operations further comprise switching an operating mode of a basic input/output system in response to the configuration drift.

13. The system of claim 8, wherein the operations further comprise inspecting an electronic log of failures to determine the computing node experiencing the hardware failure.

14. The system of claim 8, wherein the operations further comprise notifying a group manager of the cluster of the configuration drift.

15. A memory device storing instructions that when executed cause a hardware baseboard management controller to perform operations, the operations comprising:
executing a power-on self-test;
determining, during the executing of the power-on self-test, a computing node experiencing a hardware failure associated with a cluster;
retrieving, during the executing of the power-on self-test, system parameters stored by the computing node experiencing the hardware failure;
compliance checking, during the executing of the power-on self-test, by comparing the system parameters to a baseline configuration established for all computing nodes associated with the cluster;
determining, during the executing of the power-on self-test, a configuration drift in response to a deviation between the system parameters and the baseline configuration; and
executing a software application that resolves the configuration drift by autonomously changing any of the system parameters.

16. The memory device of claim 15, wherein the operations further comprise determining an error code during the executing of the power-on self-test.

17. The memory device of claim 15, wherein the operations further comprise retrieving the system parameters at a network detection of the computing node.

18. The memory device of claim 15, wherein the operations further comprise retrieving the system parameters after a detection of a hardware component in the computing node.

19. The memory device of claim 15, wherein the operations further comprise switching an operating mode of a basic input/output system in response to the configuration drift.

20. The memory device of claim 15, wherein the operations further comprise notifying a group manager of the cluster of the configuration drift.

* * * * *